United States Patent [19]

Su

[11] Patent Number: 4,684,045

[45] Date of Patent: Aug. 4, 1987

[54] CONTAINER WITH ADJUSTABLE CONTROLLED VOLUME LIQUID POURING ELEMENT

[76] Inventor: Peter T. Su, 15 Valley Forge, Houston, Tex. 77204

[21] Appl. No.: 819,062

[22] Filed: Jan. 15, 1986

[51] Int. Cl.⁴ ............................................. G01F 11/26
[52] U.S. Cl. .................................. 222/456; 222/440; 222/206
[58] Field of Search ............... 222/207, 214, 211, 209, 222/206, 464, 438, 440, 456, 425, 454; 137/329.3, 528, 171

[56] References Cited

U.S. PATENT DOCUMENTS

| | | | |
|---|---|---|---|
| 1,276,382 | 8/1918 | Loveland | 222/456 |
| 1,877,808 | 9/1932 | Cagliostro | 222/456 |
| 2,212,367 | 8/1940 | Halsey | 222/456 |
| 3,107,824 | 10/1963 | Perl | 222/207 |
| 3,172,580 | 3/1965 | Mackey | 222/456 |
| 3,223,295 | 12/1965 | Falerni et al. | 222/438 |
| 3,235,135 | 2/1966 | Robert | 222/207 |
| 4,120,429 | 10/1978 | Vignot | 222/207 |
| 4,216,882 | 8/1980 | Basile | 222/207 |
| 4,220,264 | 9/1980 | Gamadia | 222/207 |
| 4,225,061 | 9/1980 | Blake | 222/207 |
| 4,424,921 | 1/1984 | Feuerstein et al. | 222/438 |

FOREIGN PATENT DOCUMENTS

760765  3/1934  France ........................ 222/456

Primary Examiner—Joseph J. Rolla
Assistant Examiner—Kenneth Noland

[57] ABSTRACT

A portable liquid container for gravity induced dispensing of measured volumes of liquid. The container includes a liquid storage chamber and a measuring chamber, with a passage interconnecting the storage and measuring chambers for filling the measuring chambers for filling the measuring chamber. The measuring chamber may have a variable volume permitting the user to select a desired volume for dispensing or the measuring chamber may be of fixed volume.

18 Claims, 11 Drawing Figures

CONTAINER WITH ADJUSTABLE CONTROLLED VOLUME LIQUID POURING ELEMENT

BACKGROUND OF THE DISCLOSURE

This invention relates to a pouring device for allocating specific volumetric amounts of a liquid from a container. More specifically the present invention relates to portable liquid containers such as are currently used for commercial laundry detergents, insecticides, fertilizers, etc.

When using containers of liquid, measured amounts of liquid are usually required for specific use. The extra effort needed to find and utilize a suitable measuring device or container presents added difficulty. The procedure of pouring the liquid from the storage container to a measuring container and thence to the vessel in which the liquid is to be utilized is a tedious time-waster, as when many amounts are to be dispensed in a short period of time. Because of variations in the size and shape of mixing containers and other factors, sight-measuring is at best a haphazard measuring procedure.

A combination of measuring capability and storage capacity can ease usage problems especially when the liquid is toxic (e.g. insecticide), but also can result in undue complexity of operation and undependability. Prior attempts at such combination use have created less than desired results.

To preserve the speed of pouring by sight-measure, many pouring devices have been made which themselves combine the pouring function and the measuring function so that as the pouring operation proceeds, a fixed volume of liquid will be dispensed with each pouring operation. However, many of these prior known measuring pourers are bulky and conspicuous. Further, all of those prior known measuring pourers which have come to my attention are undependable and inaccurate when attempts are made to rapidly and successively dispense liquid therefrom in controlled quantities.

The present invention discloses a novel and unobvious device for dispensing precise volumes of liquid successively while minimizing difficulty in measuring. Different increments of volume can be obtained quickly and easily with minimal adjustment. In addition, successive rapid dispensing of set increments of volume is very dependable.

SUMMARY OF THE INVENTION

It is an object of the present invention to provide a combination liquid storage, measurement, and dispensing system whereby certain set volumetric liquid amounts within a broad range can be easily obtained.

Another object of the invention is to provide a liquid measurement system that is adjustable so that varying volumes can be quickly and easily dispensed by a convenient change in selected volume setting.

Still another object of the present invention is to provide a liquid measurement system that will dispense approximately the same amount of liquid with each pouring operation even though the pouring operations are successively and rapidly repeated.

A further object of this invention is to provide a measuring system that may be readily and simply adjusted without change of various parts to dispense preselected volumes of liquid within a broad range.

A still further object of the present invention is to provide a self-contained portable systems of liquid storage and measurement that can be used in an everyday uncomplicated fashion, inexpensively and simply manufactured, and easily refilled if necessary.

Yet another object of this invention is to provide a measuring pourer which can, at the option of the user, be used as a free-flow pourer.

These and other objects and advantages are achieved by the device of the present invention which provides a portable liquid container for gravity induced dispensing of measured volumes of liquid. The liquid container includes a storage chamber holding a quantity of liquid, adapted to rest in an upright position on a surface, a liquid measuring chamber with dispensing outlet and volume adjustable according to the volume of liquid selected for dispensing, and liquid transfer means permitting gravity induced filling of the liquid measuring chamber from the storage chamber when the liquid container is in its upright position. This liquid transfer means also permits gravity dispensing of measured liquid from the liquid measuring chamber while preventing transfer of liquid from the storage chamber to the liquid measuring chamber when the portable liquid container is tilted to its dispensing position.

A liquid passage is provided between the measuring chamber and storage chamber. The liquid measuring chamber is located at least partially below the bottom wall of the storage chamber to allow for gravity induced filling of the liquid measuring chamber by means of the liquid passage between the two chambers. The measuring chamber is located near one side of the storage chamber so that when the container is placed in its tilted dispensing position the measuring chamber is at an elevated position with respect to a major portion of the storage chamber. This elevated position prevents gravity induced filling of the measuring chamber while the container is in its tilted dispensing position.

One strikingly novel and unobvious feature of this portable liquid container and measuring device is the adjustability of the volume of the measuring chamber. This liquid measuring chamber is composed of movable walls so that its volume is variable. These movable walls can be configured as multifolded bellows, flexible diaphragm, piston and cylinder, or any other form of variable volume arrangement. By means of this adjustable volume measuring chamber various amounts of liquid within a set volume range can be obtained. The measuring chamber is selectively positionable at differing increments to control the amount of liquid dispensed and to enable repetitive dispensing of accurate amounts.

A tubular element extends diagonally across the liquid container from the measuring chamber located below the storage chamber upwards to the upper part of the liquid container. This tubular element is movably fixed to the measuring chamber on the tube's lower end and allows for dispensing liquid in measured amounts from the liquid measuring chamber by way of a dispensing outlet on the tube's upper end.

Valve means are provided to control gravity induced filling of the liquid measuring chamber from the storage chamber when the container is in upright position and in turn control the dispensing of measured amounts of liquid when the container is in tilted dispensing position.

IN THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF PREFERRED EMBODIMENT

Figure 1:
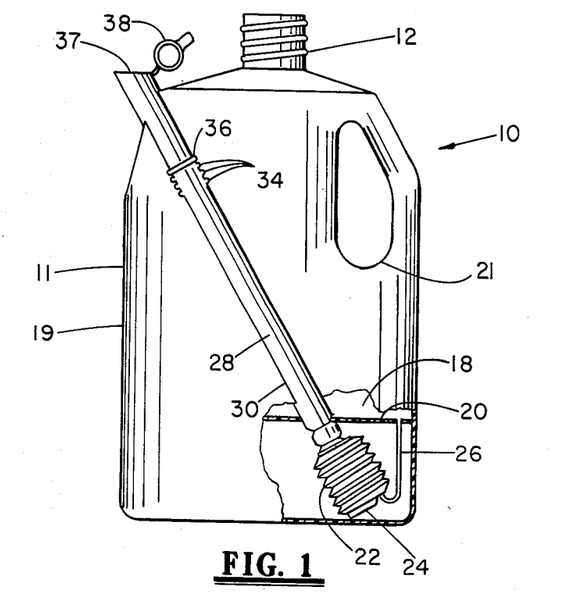
FIG. 1 is a side elevational view, with part thereof broken away and shown in section, of a portable liquid container made in accordance with this invention.

Referring now to the drawings and first to FIG. 1, a portable liquid container representing one embodiment of the invention is illustrated generally at 10. The portable liquid container 10 is defined by a container housing 11 including a threaded neck 12 extending upwardly therefrom. The housing structure 11 defines a liquid storage chamber 18 formed by side walls 19 and a bottom wall 20. The housing structure 11 also defines a handle 21 on one side thereof which may be integrally formed with the housing or may take any other suitable form.

For selection of measured quantities of liquid from the storage chamber a movable or deformable wall structure is provided. In the embodiment disclosed, this deformable wall structure may conveniently take the form of a liquid measuring chamber bellows 22 with accordion-like movable walls forming a variable volume measuring chamber 23. The bellows 22 is attached by means of a bellows mount 24 to the internal wall structure of the liquid container 10. The accordion-like configuration of the walls of the bellows and flexible material forming the wall structure of the bellows provides the bellows with lateral flexibility providing the measuring chamber with the capability for changing its volume when lateral forces are imposed on the bellows. By means of this variably adjustable volume bellows 22 various amounts of liquid within a predetermined volumetric range can be efficiently measured and dispensed. The bellows 22 is positionable at differing incremental volumes within the predetermined range.

For the dispensing of fluid from the measuring chamber a dispensing tube 28 is attached to the bellows 22 and disposed in slidable relation within a diagonal slot 30 molded in the wall structure of container 10. Dispensing tube 28 is selectively positionable relative to the container 10 to provide for lateral collapsing or extension of the bellows 22. It is desirable to secure the dispensing tube in a selected position relative to the container such as for repeated dispensing of selected measured volumes of fluid. One suitable means for so securing the dispensing tube may conveniently take the form shown in FIG. 1. A plurality of locking indentations 34 are formed by the container wall structure near the upper portion of diagonal slot 30. The indentations 34 are engaged by a raised ridge 36 on the upper exterior of the tube 28 to securely lock the dispensing tube in place. This locking arrangement allows for accurate selection of bellows 22 volume settings. The opposite end of the tube 28 from the bellows 22 is open forming a dispensing outlet 37. A cap 38 is attached to the end of tube 28 to form a closure for storage purposes. The indentations 34 are identified by indicia on the container 10 in relationship to the measured volume of the bellows 22 at various positions or settings of the dispensing tube 28. The user therefore positions the dispensing tube at a selected location and locks it in place. When the container is tipped to its dispensing position fluid flows from the measuring chamber, through the dispensing tube to the dispensing outlet.

For filling of the measuring chamber from the storage chamber a liquid passage 26 extends from the bottom wall 20 of the storage chamber and attaches to a lower portion of the bellows 22 to allow gravity induced filling of the bellows. The measuring chamber bellows 22 is located to one side of the storage chamber 18 so that when the container 10 is placed in its tilted dispensing position the bellows 22 is at an elevated position with respect to a major portion of the storage chamber 18. Thus the liquid passage 26 is also at its elevated position when the container is in its tilted dispensing position and liquid is prevented from entering the bellows through the liquid passage 26. This elevated position of the bellows 22 and liquid passage 26 prevents gravity induced filling of the bellows 22 while the container 10 is in its tilted dispensing position due to the liquid level in the storage chamber being lower than the elevated liquid passage 26 and bellows 22.

Figure 2A:
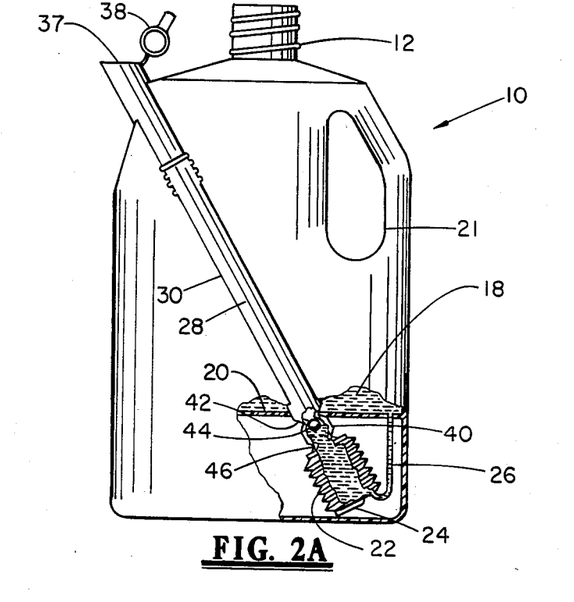
FIGS. 2A and 2B are cross-sectional views of the liquid transfer means of the portable liquid container.
Figure 2B:
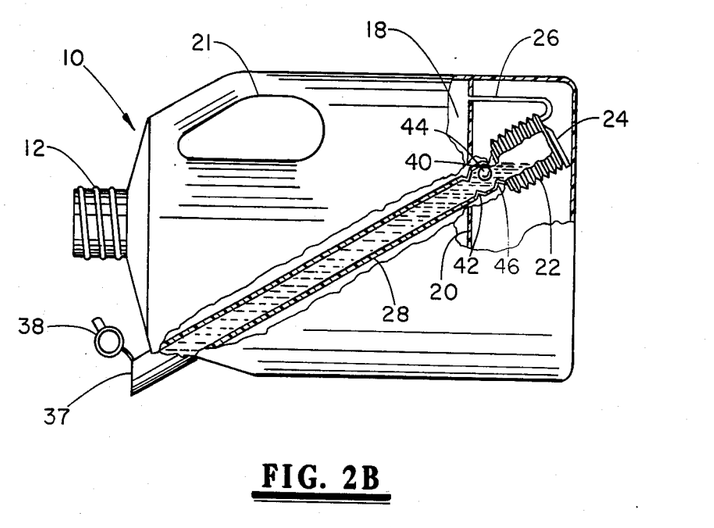

In FIGS. 2A and 2B certain aspects of the container 10 are shown in somewhat more detail. One embodiment of the liquid transfer means 40 of the invention is shown. A float valve 44 is positioned movable within the tube 28 between a valve seat 42 and a valve retainer 46. While the container 10 is in upright position, gravity induces the liquid to flow from the storage chamber 18 into the measuring chamber bellows 22 by means of the liquid passage 26. As the liquid level rises inside the bellows 22 the float valve seat 44 is raised against the valve seat 42. When seated the float valve 44 cuts off flow from the storage chamber to prevent overfilling of the bellows 22. When the container 10 is in its tilted dispensing position the downward movement in liquid level within tube 28 causes the float valve 44 to move within the bellows 22 until it is restrained by the valve retainer 46 allowing liquid to gravity flow out of the bellows 22 into the tube 28 and out of the dispensing outlet 37. Since in its tilted dispensing position the level of liquid in the storage chamber 18 is below the liquid passage 26 and the bellows 22, gravity flow ceases from the storage chamber 18 to the bellows 22 and only the precise volume of liquid initially filling the bellows 22 is dispensed.

Figure 3A:
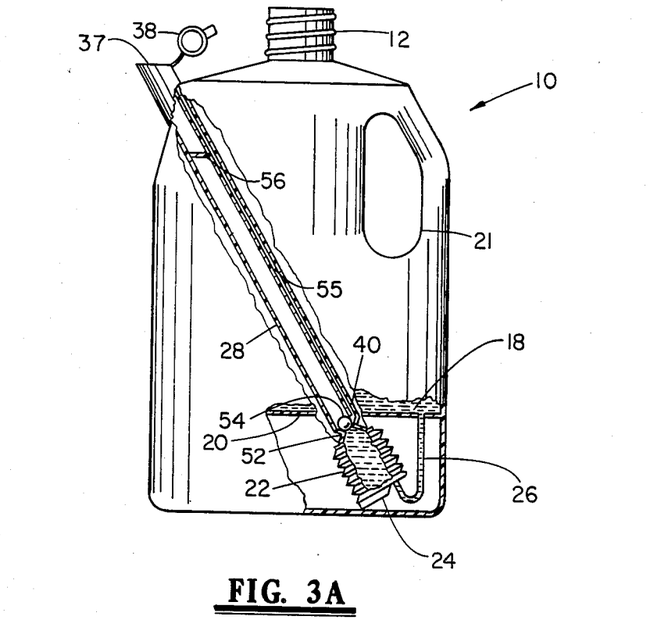
FIGS. 3A and 3B are cross-sectional views of an alternative embodiment of the liquid transfer means of the portable liquid container.
Figure 3B:
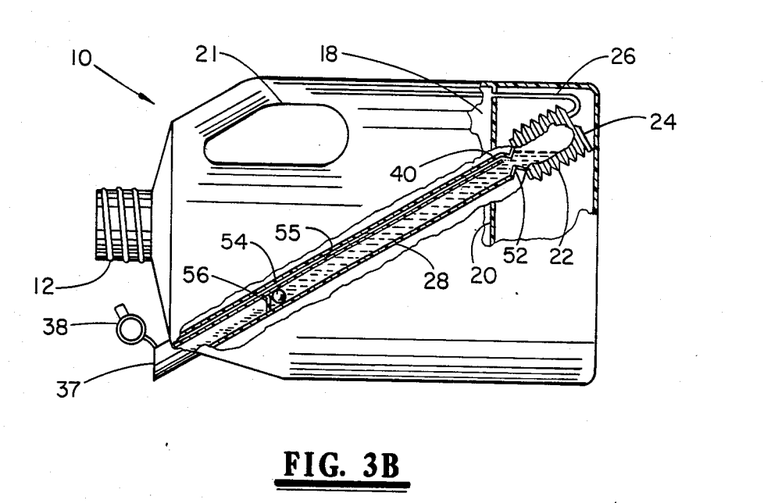

In FIGS. 3A and 3B an alternative embodiment of the liquid transfer means 40 of this invention is shown. The container is of the same general structure as described above and like parts are identified by like reference numerals. A spherical valve member 4 with specific gravity greater than the measured liquid is positioned movably within the tube 28 between a valve seat 52 and a valve retainer 56. While the container 10 is in upright position the liquid gravity flows from the storage chamber 18 into the measuring chamber bellows 22 by means of the liquid passage 26. A vent passage 55 is provided along the dispensing tube 28 to allow venting of air from the bellows 22 while filling. The liquid level rises inside the bellows 22 until it reaches the heavy spherical valve member 54 which is seated by gravity against the valve seat 52. When the container 10 is in tilted dispensing position the heavy spherical valve member 54 is displaced by gravity down the tube 28 until it reaches the valve retainer 56. In this position liquid flow past the valve member occurs, allowing liquid to flow by gravity from the bellows 22 through the dispensing tube 28 where it exits at the dispensing outlet 37. Since in the tilted dispensing position the level of liquid in the storage chamber 18 is below the liquid passage 26 and the bellows 22, gravity flow ceases from the storage chamber 18 to the bellows 22 and only the precise volume of liquid initially filling the bellows 22 is dispensed.

Figure 4:
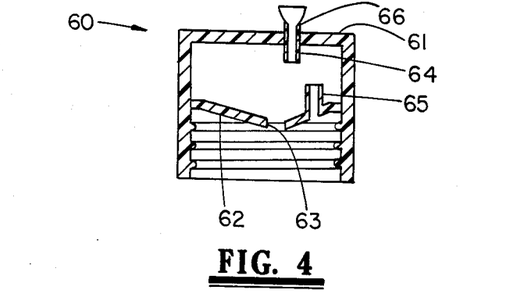
FIG. 4 is a cross-sectional view of the cap of the portable liquid container.

In FIG. 4 a cross-sectional view of the threaded cap 60 of the portable liquid container is shown. The cap is provided with an interior funnel-shaped ledge 62 defining an opening 63 in the center thereof. An air vent tube 65 extends upwardly from the funnel-shaped ledge 62 and forms an air vent passage. An air vent 64 extends downwardly from the upper wall 61 of the cap and defines a vent passage. The air vent 64 is axially offset from the air vent tube 65 and the opening 63. A frangible closure 66 is provided to seal the air vent 64 in order to prevent spillage during shipping. The closure 66 is broken away to open the air vent passage of tube 64 to the atmosphere.

Figure 5:
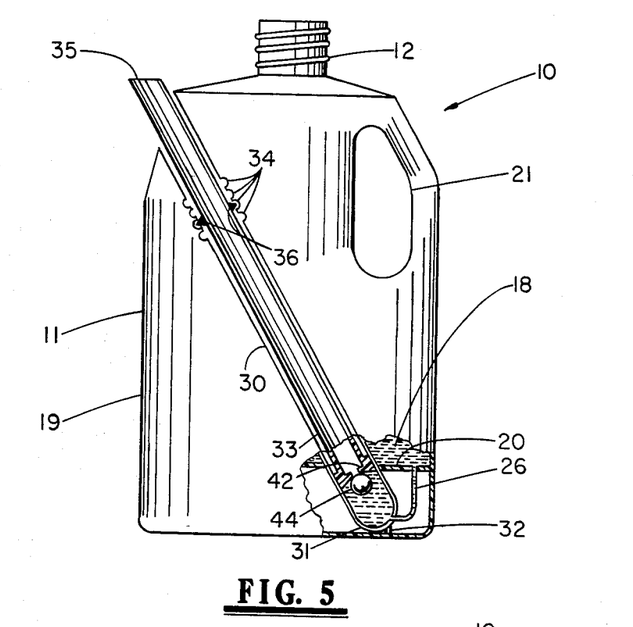
FIG. 5 is a cross-sectional view of an alternative embodiment of the measuring chamber of the portable liquid container.

In FIG. 5 an alternative embodiment of the portable liquid container 10 of FIG. 1 is illustrated. For purposes of simplicity like parts of the two structures are identified by like reference numerals. For selection of measured quantities of liquid from the storage chamber 18 a movable wall structure is provided. In the embodiment disclosed, this movable wall structure may conveniently take the form of a liquid measuring chamber cylinder 31 together with corresponding piston 33 forming a variable volume measuring chamber. The cylinder 31 is attached by means of a cylinder mount 32 to the internal wall structure of the liquid container 10. The piston 33 is movable within the cylinder 31 to provide the user with the capability for selecting a desired volume of the measuring chamber. For this purpose, the user moves the piston 33 up or down to a desired position within the cylinder 31.

By means of this variably adjustable volume capability various amounts of liquid within a predetermined volumetric range can be efficiently measured and dispensed. The piston 33 is positionable at differing incremental positions for selection of desired measured volumes within the predetermined range.

The piston 33 is formed from a hollow tube which defines a dispensing passage such that fluid may flow from the measuring chamber cylinder 31 through the dispensing passage of piston 33 in order to be dispensed. For the dispensing of fluid from the measuring chamber a dispensing spout 35 is formed at the upper end of the piston 33. The piston 33 is disposed in slidable relation within the cylinder 31 which is itself disposed within a diagonal slot 30 molded in the wall structure of container 10. The piston 33 is selectively positionable relative to the container 10 to increase or decrease the measuring volume of the cylinder 31. It is desirable to secure the piston 33 in a selected position relative to the container 10 such as for repeated dispensing of selected measured volumes of fluid. One suitable means for so securing the piston may conveniently take the form as shown in FIG. 5. A plurality of locking indentations 34 are formed by the cylinder wall structure near the upper portion of the cylinder. The indentations 34 are engaged by a raised ridge 36 on the upper exterior of the piston 33 to securely lock the piston 33 in place. This locking arrangement allows for accurate selection of particular volume settings of cylinder 31. The indentations 34 are identified by indicia on the container 10 in relationship to the measured volume of the cylinder 31 at various positions or settings of the piston 33. The user therefore positions the dispensing tube at a selected location and locks it in place. When the container 10 is tipped to its dispensing position, fluid flows from the measuring chamber cylinder 31, through the hollow piston 33 to the dispensing spout 35.

For filling of the cylinder 31 from the storage chamber 18 a liquid passage 26 extends from the bottom wall 20 of the storage chamber 18 and attaches to a lower portion of the cylinder 31 to allow gravity induced filling of the cylinder 31. One suitable means of controlling the gravity induced filling of the cylinder can conveniently take the form as shown in FIG. 5. A float valve 44 is positioned movably within the cylinder 31. While the container 10 is in upright position, gravity induces the liquid to flow from the storage chamber 18 into the measuring chamber cylinder 31 by means of liquid passage 26. As the liquid level rises inside the cylinder 31 the float valve 44 is raised agaist the valve seat 42. When seated, the float valve 44 cuts off flow from the storage chamber 18 to prevent overfilling of the cylinder 31. When the container 10 is in its tilted dispensing position the downward movement in liquid level within the cylinder 31 causes the float valve 44 to move within the cylinder 31 until it is unseated from valve seat 42 allowing liquid to gravity flow out of the cylinder 31 into the piston 33 and out of the dispensing spout 35. Since in its tilted dispensing position the level of the liquid in the storage chamber 18 is below the liquid passage 26 and the cylinder 31 gravity flow ceases from the storage chamber 18 to the cylinder 31 and only the precise volume of liquid initially filling the cylinder 31 is dispensed.

Figure 6:
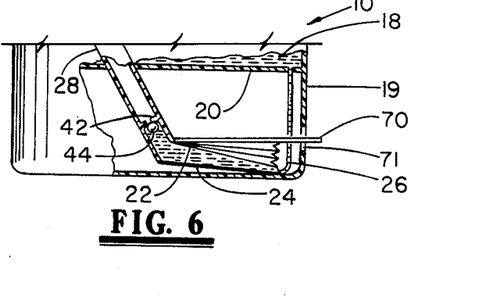
FIG. 6 is a partial cross-sectional view of an alternative embodiment of the measuring chamber of the portable liquid container.
Figure 6A:
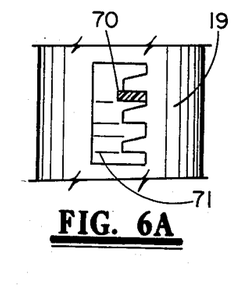
FIG. 6A is a partial end view of the embodiment of FIG. 6, showing positioning of the volume selector element.

In FIG. 6, an alternative embodiment of the portable liquid container 10 of FIG. 1 is illustrated. For purposes of simplicity like parts of the two structures are identified by like reference numerals. For selection of measured quantities of liquid from the storage chamber 18 a deformable wall structure is provided. In the embodiment disclosed, this deformable wall structure may conveniently take the form of a liquid measuring chamber bellows 22 with accordian-like movable walls forming a variable volume measuring chamber. The bellows 22 is attached by means of a bellows mount 24 to the internal wall structure of the liquid container 10. The bellows 22 is positionable at differing incremental volumes within a predetermined range.

The bellows structure shown in FIG. 6 differs from the bellows structure shown in FIG. 1 in the mechanism setting the volume of the bellows. In FIG. 6 the bellows structure includes a handle 70 which is attached to the upper wall of the bellows 22. The bellows handle 70 extends through a slot 71 formed in the side wall 19 of the liquid container 10. The slot 71 is of elongated form, allowing the handle 70 to be adjusted up and down thus causing corresponding adjustment of the volume of the bellows 22 due to the collapsing or expanding thereof by means of its attached handle 70. This means of bellows volume adjustment in FIG. 6 is an alternative to the slidable tube 28 adjustment of the bellows of FIG. 1.

Figure 7A:
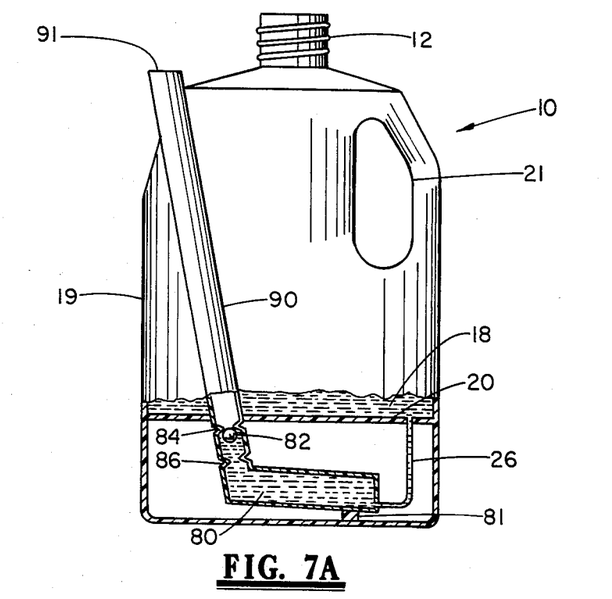
FIG. 7A is a cross-sectional view of an alternative embodiment of the measuring chamber of the portable liquid container with a fixed volume measuring chamber.

In FIG. 7A, an alternative embodiment of the portable liquid container 10 of FIG. 1 is illustrated. For purposes of simplicity like parts of the two structures are identified by like reference numerals. Instead of a deformable wall structure provided for variable volume selection of the measuring chamber as in FIG. 1, FIG. 7A shows a fixed volume measuring chamber 80. The fixed volume measuring chamber 80 is attached by means of a chamber mount 81 to the internal wall structure of the liquid container 10.

For the dispensing of fluid from the fixed volume measuring chamber 80 a fixed volume dispensing tube 90 is attached to the chamber 80. The opposite end of the tube 90 from the chamber 80 is open forming a dispensing outlet 91.

For gravity induced filling of the fixed volume measuring chamber 80 from the storage chamber 18 a liquid transfer passage 26 extends from the bottom wall 20 of the storage chamber 18 and attaches to a lower portion of the measuring chamber. The measuring chamber 80 is located to one side of the storage chamber 18 so that when the container 10 is placed in its tilted dispensing position the measuring chamber is at an elevated position with respect to a major portion of the storage chamber 18. Thus, the liquid passage 26 is also at its elevated position when the container 10 is in its tilted dispensing position and liquid is prevented from entering the measuring chamber through the liquid passage. This elevated position of the fixed volume measuring chamber 80 and liquid passage 26 prevents gravity induced filling of the measuring chamber 80 while the container 10 is in its tilted dispensing position due to the liquid level in the storage chamber 18 being lower than the elevated liquid passage 26 and the measuring chamber.

A float valve 82 is movably positioned within the fixed volume dispensing tube 90 between a valve seat 84 and a valve retainer 86. While the container 10 is in upright position, gravity induces the liquid to flow from the storage chamber 18 into the fixed volume measuring chamber 80 by means of the liquid passage 26. As the liquid level rises inside the measuring chamber 80 the float valve 82 is raised against the valve seat 84. When seated, the float valve 82 cuts of flow from the storage chamber 18 to prevent overfilling of the measuring chamber. When the container 10 is in its tilted dispensing position the downward movement in liquid level within the tube 90 causes the float valve 82 to move within the measuring chamber 80 until it is restrained by the valve retainer 86 allowing liquid to flow by gravity out of the measuring chamber 80 into the dispensing tube 90 and out of the dispensing outlet 91. Since in its tilted dispensing position the storage chamber 18 is below the dispensing tube 26 and also below the level of the liquid within the storage chamber, no liquid will flow from the storage chamber to the measuring chamber. Thus, the measuring chamber will be filled only when the container is in its upright position. During dispensing, the volume of liquid dispensed will always be restricted solely to the volume contained within the measuring chamber.

Figure 7B:
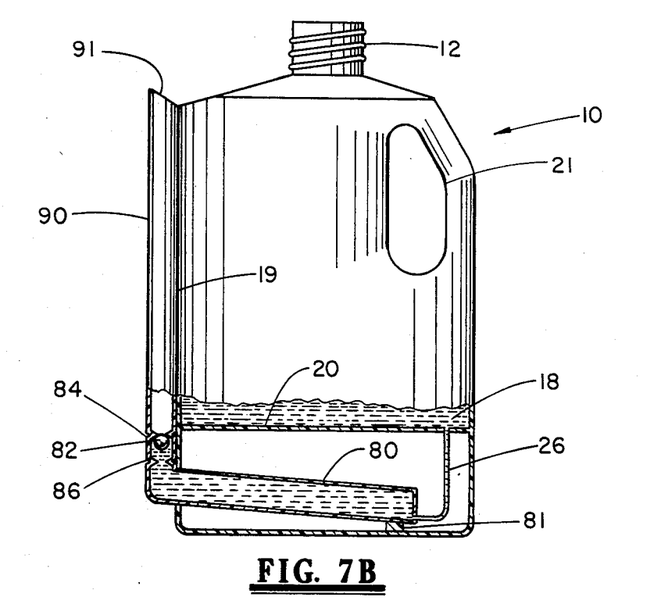
FIG. 7B is a cross-sectional view of an alternative embodiment of the measuring chamber of the portable liquid container with a fixed volume measuring chamber and external dispensing tube.

The difference between the structures of FIG. 7A and FIG. 7B is only the location of the dispensing tube 90. In FIG. 7A the dispensing tube is located transversely of the principal container structure and, if desired, may be internally of the container. In FIG. 7B the dispensing tube 90 is located externally of the container. In either case, the dispensing tube may be attached to the container or in the alternative may be molded integrally with the container structure.

What is claimed is:

1. A portable liquid container for gravity induced dispensing of measured volumes of liquid, comprising:
    (a) container housing means having side walls and a bottom wall forming a storage chamber for containing a quantity of liquid and adapted to rest in an upright position on a surface;
    (b) means defining a liquid measuring chamber located at least partially below said bottom wall and having a dispensing outlet and forming a measurement chamber having a volume that is adjustable according to the volume of liquid selected for dispensing; and
    (c) a tubular element forming a liquid passage extending from said bottom wall to said liquid measuring chamber and permitting gravity induced filling of said liquid measuring chamber from said storage chamber when said portable liquid container is in its upright position, said tubular element permitting gravity dispensing of measured liquid from said liquid measuring chamber and preventing transfer of liquid from said storage chamber to said liquid measuring chamber when said portable liquid container is tilted to its dispensing position, said tubular element being located at the upper portions of said bottom wall and said measurement chamber at said dispensing position of said portable liquid container.

2. A portable liquid container as recited in claim 1, wherein:
    (a) said liquid measuring chamber is located at one side of said container housing means and near the juncture of said bottom wall and a portion of said side walls; and
    (b) at said tilted dispensing position of said portable liquid container said liquid measuring chamber is located at an elevated position with respect to a major portion of said container housing means.

3. A portable liquid container as recited in claim 1, including:
    valve means controlling filling of said liquid measuring chamber in the upright position of said portable liquid container and preventing liquid flow from said storage chamber through said tubular element to said liquid measuring chamber when said portable liquid container is in its tilted dispensing position.

4. A portable liquid container as recited in claim 3, wherein:

(a) an elongated tubular member extends from said liquid measuring chamber and forms said dispensing outlet;
(b) a valve retainer is defined within said elongated tubular element;
(c) a valve seat is defined within said elongated tubular member is spaced relation with said valve retainer; and
(d) said valve means is a float valve movably positioned between said valve seat and said valve retainer and said float valve is moved to seated relation with said valve seat when said liquid measuring chamber has reached the filled condition thereof and said float valve is moved to retained relation with said valve retainer at the tilted dispensing position of said portable liquid container.

5. A portable liquid container as recited in claim 3, wherein:
(a) an elongated tubular member extends from said liquid measuring chamber and forms said dispensing outlet;
(b) a valve seat is defined within said elongated tubular element near said liquid measuring chamber;
(c) valve retainer means is defined within said elongated tubular member between said valve seat and said dispensing outlet;
(d) said valve means is a valve element movably positioned within said elongated tubular member and between said valve seat and said valve retainer means; and
(e) said valve element is positioned by gravity against said valve seat when said portable liquid container is in upright position and is positioned by gravity in restrained contact with said valve retainer means when said portable liquid container is in tilted dispensing position.

6. A portable liquid container as recited in claim 5, wherein:
(a) said valve element is a spherical member having a specific gravity greater than that of the liquid to be dispensed; and
(b) said valve retainer means permits flow of liquid through said elongated tubular member with said valve element in restrained contact therewith.

7. A portable liquid container as recited in claim 1, wherein movable wall means forms said liquid measuring chamber and is selectively movable for establishment of desired volume.

8. A portable liquid container as recited in claim 7, wherein said movable wall means defines a multifolded bellows configuration.

9. A portable liquid container as recited in claim 7, wherein:
(a) an elongated tubular element forming said dispensing outlet means extends from said movable wall means and is disposed in movable relation with said container housing means; and
(b) said elongated tubular element is selectively positionable relative to said container housing means for achieving selective movement of said movable wall means.

10. A portable liquid container as recited in claim 9, wherein:
(a) said container housing means defines a plurality of spaced positioning element each representing selected volumetric positions of said movable wall means; and (b) said elongated tubular element defines stop means engagable with selected ones of said spaced positioning elements for restraining said elongated tubular element and said movable wall means at selected positions.

11. A portable liquid container as recited in claim 10, wherein:
(a) said container housing means forms an elongated receptacle receiving said elongated tubular element therein;
(b) said spaced positioning elements are positioning grooves formed by said container housing means; and
(c) said stop means is an external detent formed by said elongated tubular member and being selectively receivable within selected ones of said positioning grooves.

12. A portable liquid container as recited in claim 7, wherein:
(a) an elongated tubular element forming said dispensing outlet means extends from said movable wall means and is disposed in movable relation with said container housing means;
(b) said elongated tubular element is selectively positionable relative to said container housing means for achieving selective movement of said movable wall means; and
(c) vent passage means is formed in said elongated tubular element and provides for air transfer into said measuring chamber during dispensing of measured liquid therefrom.

13. A portable liquid container as recited in claim 7, wherein said means defining said liquid measuring chamber comprises:
(a) an elongated tubular member extending into said container housing means and forming a piston passage, said liquid transfer means being a passage interconnecting said storage chamber and the lower portion of said elongated tubular member;
(b) an elongated piston member being selectively positionable with said elongated tubular member and defining a variable volume measuring chamber at the lower extremity of said elongated tubular member, the volume of said measuring chamber being varied by the position of said elongated piston member within said elongated tubular member, said elongated piston member defining a dispensing passage and a valve seat; and
(c) a float valve being received within said variable volume measuring chamber and being moved by liquid into seated engagement with the valve seat when said variable volume measuring chamber has reached its filled condition.

14. A portable liquid container as recited in claim 7 wherein:
(a) said container defines a volume selection slot near said variable volume measuring chamber; and
(b) a volume selection member is fixed to said variable volume measuring chamber with a portion thereof extending through said volume selection slot and being movable to various selected positions within said volume selection slot, positioning of said volume selection member establishing selected volumes of said variable volume measuring chamber.

15. A portable liquid container for gravity induced dispensing of measured volumes of liquid, comprising:

(a) a container housing having side walls and a bottom wall and forming a storage chamber for containing a quantity of liquid, said container being at an upstanding position when said bottom wall is oriented at a position near horizontal;
(b) a movable wall structure forming a variable volume liquid measuring chamber being located at least partially below said bottom wall;
(c) means for selectively moving said movable wall structure and establishing selected volumes within said liquid measuring chamber;
(d) an elongated tubular element forming a dispensing passage extending from said movable wall structure and defining a dispensing outlet, said elongated tubular element being selectively positionable relative to said container housing for selective measure volumes of said variable volume liquid measuring chamber;
(e) means defining a flow passage communicating said variable volume liquid measuring chamber with said storage chamber; and
(f) means permitting gravity induced filling of said liquid measuring chamber from said storage chamber when said container housing is upright and preventing transfer of liquid from said storage chamber to said liquid measuring chamber and permitting gravity induced dispensing of liquid from said liquid measuring chamber through said dispensing outlet when said container housing is tilted to said dispensing position;
(g) said movable wall structure defines a multifolded bellows structure; and
(h) said elongated tubular element induces collaping and extension of said multifolded bellows structure upon movement of said elongated tubular element to selected positions.

16. A portable liquid container container as recited in claim 15, wherein:
said container housing defines means retaining said elongated tubular element at selected positions thereof relative to said container housing.

17. A portable liquid container as recited in claim 16, wherein:
(a) said movable wall means is located at a lower side portion of said container housing; and
(b) said elongated tubular element extends diagonally across said container housing from said movable wall means to the upper, opposite side portion of said container housing.

18. A portable liquid container as recited in claim 15, wherein:
(a) said container housing defines a threaded filling and dispensing member at the upper portion thereof;
(b) a closure cap is received by said threaded filling and dispensing member, said closure cap defines an internal tapered ledge forming an air inlet opening;
(c) an air inlet tube extends upwardly from said tapered ledge to one side of said air inlet opening at the upper portion of said container housing and admits air into said storage chamber as liquid flows therefrom into said liquid measuring chamber;
(d) a tubular member extends downwardly from the upper portion of said closure cap and is in offset relation with said air inlet opening and said air inlet tube; and
(e) said air inlet opening said air inlet tube and said tubular member prevent leakage of liquid from said closure cap when said container housing is tilted to said dispensing position.

* * * * *